(12) United States Patent
Lolli

(10) Patent No.: US 8,251,106 B2
(45) Date of Patent: Aug. 28, 2012

(54) UNIT FOR REPAIRING AND INFLATING AN INFLATABLE ARTICLE, VEHICLE COMPRISING A UNIT FOR REPAIRING AND INFLATING INFLATABLE ARTICLES, AND RELATIVE METHOD

(75) Inventor: Sergio Lolli, Pesaro (IT)

(73) Assignee: Tek Global S.R.L., Pesaro (IT)

( * ) Notice: Subject to any disclaimer, the term of this patent is extended or adjusted under 35 U.S.C. 154(b) by 429 days.

(21) Appl. No.: 12/526,402

(22) PCT Filed: Dec. 12, 2007

(86) PCT No.: PCT/IB2007/003875
§ 371 (c)(1),
(2), (4) Date: Jan. 5, 2010

(87) PCT Pub. No.: WO2008/096198
PCT Pub. Date: Aug. 14, 2008

(65) Prior Publication Data
US 2010/0108187 A1  May 6, 2010

(30) Foreign Application Priority Data
Feb. 9, 2007  (IT) .............................. TO2007A0101

(51) Int. Cl.
*B65B 31/00* (2006.01)

(52) U.S. Cl. ................ 141/38; 81/15.6; 141/9; 137/223
(58) Field of Classification Search ................ 141/5, 9, 141/38, 67, 105; 222/372; 81/15.6; 137/223
See application file for complete search history.

(56) References Cited

U.S. PATENT DOCUMENTS

| | | | |
|---|---|---|---|
| 4,782,878 A * | 11/1988 | Mittal | 152/417 |
| 6,345,650 B1 * | 2/2002 | Paasch et al. | 141/5 |
| 6,766,834 B1 | 7/2004 | Eckhardt | |
| 7,389,800 B2 * | 6/2008 | Hickman et al. | 141/26 |
| 2006/0086403 A1 | 4/2006 | Kant et al. | |
| 2007/0181209 A1 * | 8/2007 | Stehle | 141/38 |

FOREIGN PATENT DOCUMENTS
EP  1 358 996  11/2003
\* cited by examiner

*Primary Examiner* — Gregory Huson
*Assistant Examiner* — Jason Niesz
(74) *Attorney, Agent, or Firm* — Ladas & Parry LLP

(57) ABSTRACT

A unit, for repairing and inflating an inflatable article, defines a volume for a sealing fluid; an inlet for compressed air; and an outlet connected fluidically to the inlet via the volume to inject the sealing fluid into the inflatable article by means of the compressed air. More specifically, the inlet is connected by releasable fluidic connecting means to a fluidic outlet port of a pneumatic circuit of a vehicle having a compressed-air source and at least one pneumatic actuator connected to the compressed-air source.

19 Claims, 3 Drawing Sheets

UNIT FOR REPAIRING AND INFLATING AN INFLATABLE ARTICLE, VEHICLE COMPRISING A UNIT FOR REPAIRING AND INFLATING INFLATABLE ARTICLES, AND RELATIVE METHOD

TECHNICAL FIELD

The present invention relates to a unit for repairing and inflating inflatable articles, e.g. a flat vehicle tyre. The present invention also relates to a vehicle comprising a unit for repairing and inflating an inflatable article, and to a method of repairing and inflating an inflatable article.

BACKGROUND ART

A flat tyre may be replaced with a spare wheel stowed in a compartment on the vehicle specially designed for the purpose, e.g. under the floor of the boot, in the case of a passenger car.

The spare wheel, however, is bulky and takes up space in the boot that could be used for other purposes.

Moreover, the weight of the spare wheel makes it difficult to assemble, particularly in the case of a large heavy-duty vehicle spare wheel.

Repair and inflation kits are also known, for repairing a flat tyre without taking it off the vehicle.

Known kits comprise a container of sealing fluid, and a dedicated compressor connected to the container of sealing fluid. In the event of a flat tyre, the container is connected to the tyre by a hose, and the dedicated compressor then activated.

The compressed air injects the sealing fluid into the tyre, and inflates it once the viscosity of the fluid increases and seals the puncture in the tyre.

The dedicated compressor normally used in known kits is a reciprocating type powered by an electric motor. Compressors of this type are relatively noisy and bulky, particularly when designed for inflating large heavy-duty vehicle tyres.

U.S. Pat. No. 6,766,834 discloses a unit according to the preamble of claim 1. Such unit, however, needs to be adapted when the pressure source is a pneumatic circuit of the vehicle.

DISCLOSURE OF INVENTION

It is an object of the present invention to provide a unit for repairing and inflating inflatable articles, designed to eliminate the aforementioned drawbacks.

According to the present invention, there is provided a unit for repairing and inflating inflatable articles, the unit defining a volume containing a sealing fluid; an inlet and an outlet connected fluidically via the volume; and releasable fluidic connecting means for connecting the inlet to an outlet port of a pneumatic circuit of a vehicle comprising a pressure source and at least one actuator.

The repair unit therefore has no dedicated compressor, pressure being generated by an existing on-vehicle compressor mainly used to control a vehicle part, such as a brake caliper.

The above technical characteristics are common to the unit defined in the claims.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
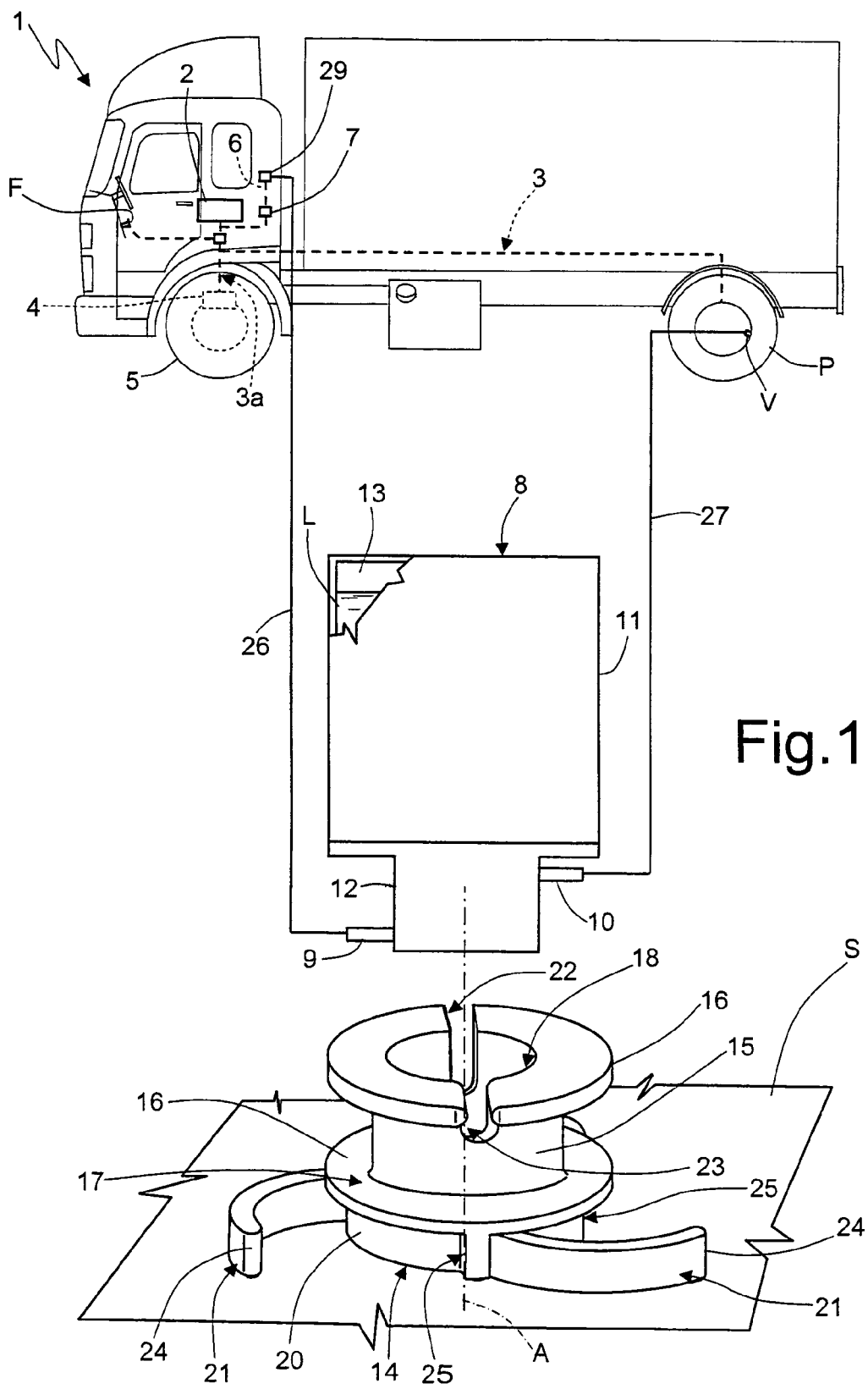
FIG. 1 shows, schematically and not to scale, a vehicle comprising a unit for repairing and inflating inflatable articles in accordance with the present invention.

Number 1 in FIG. 1 indicates a vehicle comprising an internal combustion engine (not shown), and a compressed-air source 2 connected rigidly to a fixed structure, e.g. the frame, of the vehicle.

Vehicle 1 also comprises a compressed-air line 3 having a conduit 3a connected rigidly to the frame to conduct compressed air from compressed-air source 2 to a pneumatic actuator 4 connected to line 3 and supplied by source 2.

Pneumatic actuator 4, for example, is an actuator of a braking system of wheels 5 of vehicle 1.

Line 3 also comprises an outlet port 6 connected rigidly to the frame and normally closed by a closing member 7, e.g. a tap or non-return valve.

Vehicle 1 comprises a sealing-fluid-containing device comprising a container of sealing fluid 8 defining a compressed-air inlet 9 and an outlet 10 for a sealing fluid L.

More specifically, container 8 comprises a bottle 11; and a dispenser 12 defining inlet 9 and outlet 10 and connected releasably to the neck (not shown) of bottle 11.

Container 8 preferably comprises an inner valve (not shown) connecting inlet 9 fluidically to outlet 10 via an inner volume 13 of bottle 11, and may be formed as described in International Patent Application WO-A1-2005084968 filed by the Applicant.

The sealing-fluid-containing device also comprises a pedestal 14 connectable to container 8 by releasable connecting means, such as a threaded connector or fast-fit coupling.

More specifically, the releasable connecting means are such that, when carrying out the repair and inflation operation, container 8 is in a substantially vertical operating position, in which dispenser 12 faces downwards and is interposed between bottle 11 and a supporting surface S on which pedestal 14 rests (FIG. 1).

In one embodiment, pedestal 14 comprises a tubular body 15 having an axis A; and two flanges 16 projecting radially from tubular body 15 and spaced axially apart to define an annular recess 17.

Tubular body 15 defines a cavity 18 coaxial with axis A and defining a seat for at least a portion of dispenser 12.

Pedestal 14 also comprises a supporting portion 20 adjacent to one of flanges 16; and a number of arms 21 connected to supporting portion 20. Tubular body 15 and the flange 16 axially opposite supporting portion 20 define radially through grooves 22, 23 substantially parallel to axis A and defining respective seats for inlet 9 and outlet 10 (in FIG. 1, container 8 is rotated with respect to the assembly position to illustrate inlet 9 and outlet 10 schematically).

In a preferred embodiment, arms 21 are movable between an extracted position (FIG. 1) and a withdrawn position. In the extracted position, respective free end portions 24 of arms 21 are further away from axis A than when arms 21 are in the withdrawn position.

Arms 21 are preferably hinged about respective axes parallel to axis A, and supporting portion 20 defines respective seats 25 for housing arms 21 in the withdrawn position.

In a preferred embodiment, the maximum crosswise dimension of pedestal 14, measured in a plane perpendicular to axis A, equals or is smaller than that of container 8 when arms 21 are in the withdrawn position.

The sealing-fluid-containing device defines a unit for repairing and inflating inflatable articles, when connected to compressed-air source 2 by outlet port 6.

The unit for repairing and inflating inflatable articles may also comprise a pressure regulating valve 29 located upstream from volume 13 to set the airflow from outlet port 6 to the best pressure for injecting sealing fluid L. For example, pressure regulating valve 29 may be mounted directly on outlet port 6. Preferably, pressure regulating valve 29 provides for continuously regulating the pressure of the compressed air from compressed-air line 3.

Vehicle 1, comprising the unit for repairing and inflating inflatable articles, operates as follows.

Normally, compressed-air line 3 is activated, when necessary, by the user pressing a brake pedal F to slow down the vehicle.

To repair a flat tyre P, the user connects outlet 10 by means of a second hose 27 to a valve V of flat tyre P, and connects outlet port 6 of line 3 to inlet 9 by means of releasable connecting means 26 preferably comprising a hose fitted on the ends with respective fast-fit couplings.

When container 8 is connected to line 3, compressed air flows into bottle 11 and injects sealing fluid L through valve V into flat tyre P. When injecting the sealing fluid, container 8 is mounted on pedestal 14, which rests on supporting surface S, with arms 21 in the extracted position.

When all the sealing fluid L has been injected into flat tyre P, compressed air flows through the empty container 8 to inflate flat tyre P.

Once the tyre is inflated to the right pressure, hoses 26 and 27 are disconnected and wound about tubular portion 15, at least partly inside annular recess 17, and arms 21 are withdrawn inside respective seats 25, thus reducing the overall size of the sealing-fluid-containing device comprising container 8 and pedestal 14.

Figure 2:
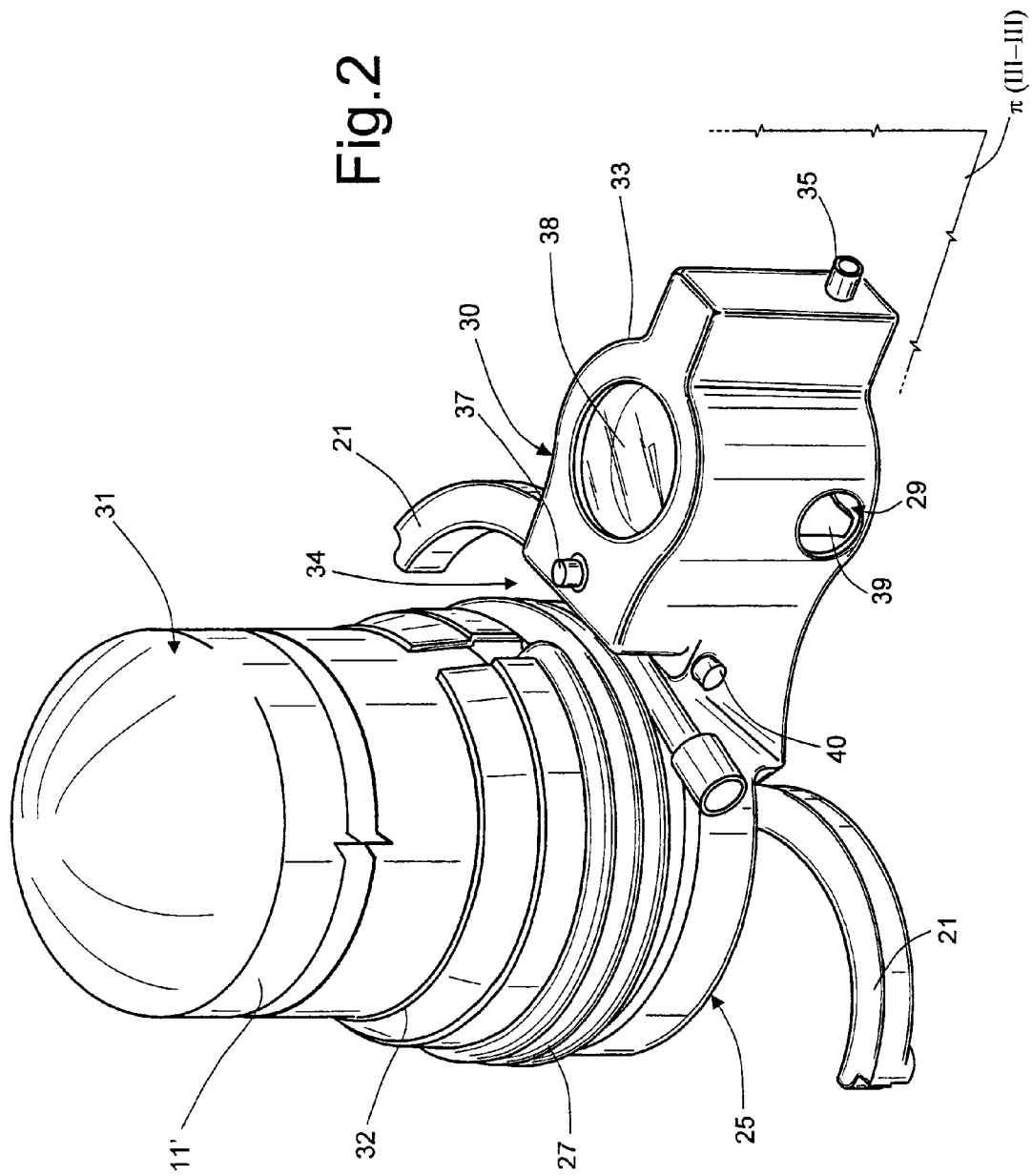
FIG. 2 shows a view in perspective of a second embodiment of the present invention.

FIG. 2 shows a sealing-fluid-containing device, in which parts identical to those described above are indicated using the same reference numbers.

The FIG. 2 device comprises a pedestal 30; and a container 31, for sealing fluid L, connected releasably to pedestal 30.

The bottle 11' of container 31 preferably comprises a cylindrical body, and a convex, e.g. hemispherical, top.

Pedestal 30 comprises a supporting body 32, to which container 31 is connected; and a secondary body 33 connected rigidly to, and defining a recess 34 with, supporting body 32.

Pedestal 30 is substantially symmetrical with respect to a plane $\pi$ (only shown partly in FIG. 2); and secondary body 33 is smaller than the supporting body in a direction perpendicular to plane $\pi$, and may also be smaller in height than supporting body 32.

Pedestal 30, and preferably supporting body 32, defines two seats 25 adjacent to supporting surface S, and comprises two extractable arms 21 withdrawable inside seats 25. Preferably, arms 21 are symmetrical with respect to plane $\pi$, and define respective supporting points for pedestal 30 in a direction perpendicular to plane $\pi$.

Supporting body 32 is cylindrical, and defines annular recess 17 for housing hose 27 connected to outlet 10 (FIG. 3) of container 31. Accordingly, arms 21 are arc-shaped and hinged to respective peripheral portions of supporting body 32 so as to be concentric with supporting body 32 in the withdrawn position.

Figure 3:
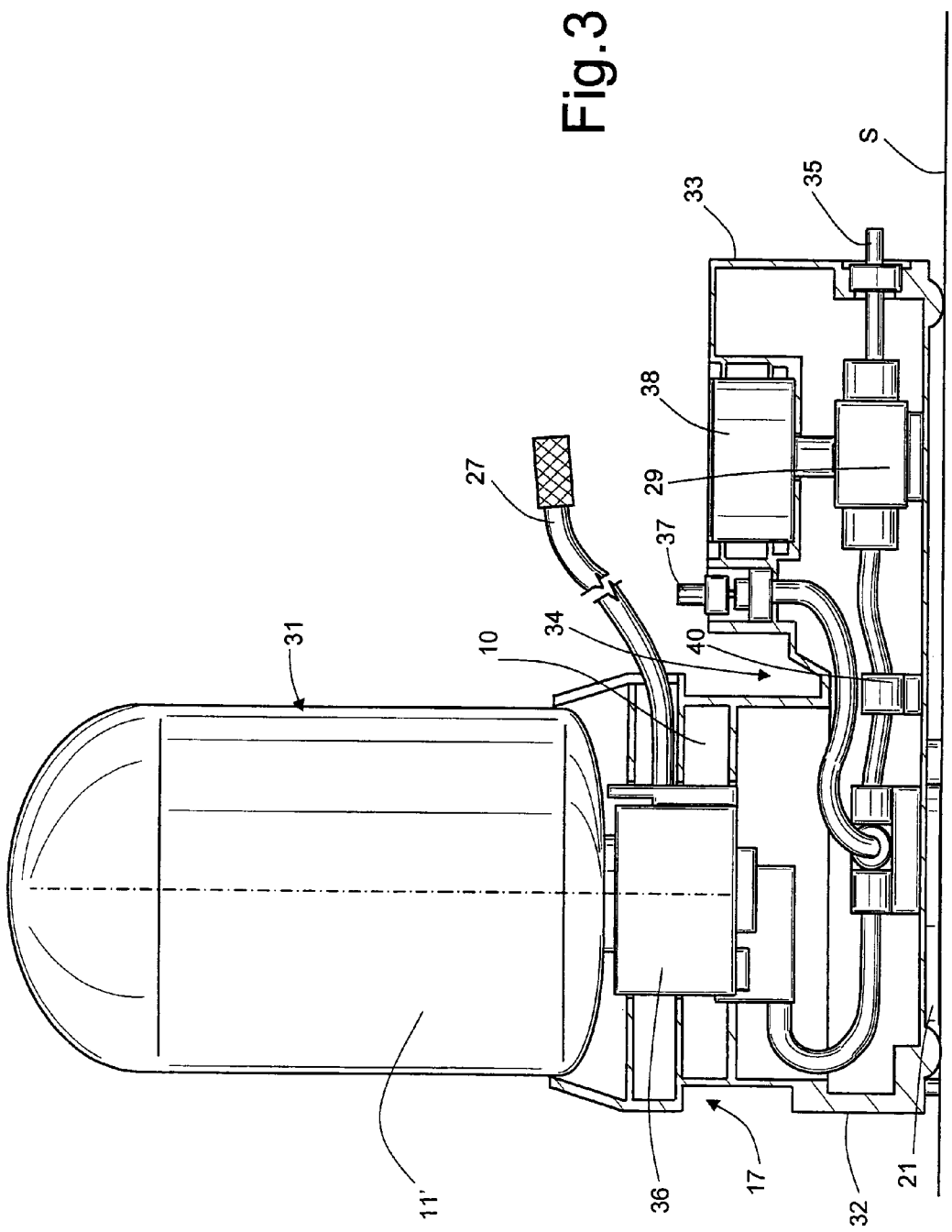
FIG. 3 shows a section along plane in FIG. 2.

FIG. 3 shows a fluidic circuit mounted inside pedestal 30.

The fluidic circuit connects an inlet 35 on secondary body 33 to releasable connecting means 36 carried by supporting body 32 and cooperating with container 31.

The fluidic circuit comprises pressure regulating valve 29 connected between inlet 35 and releasable connecting means 36 to set the airflow from outlet port 6 to inlet 35 to the best pressure for injecting sealing fluid L.

The circuit preferably also comprises a release valve 37 series- or parallel-connected to volume 13.

The fluidic circuit also comprises a gauge 38 for measuring the pressure of tyre P and connected, for example, downstream from pressure regulating valve 29, with a screen on secondary body 33.

In the FIGS. 2 and 3 embodiment, outlet 10 of container 31 is connected permanently to hose 27, whereas inlet 9 is connected to the hose of releasable fluidic connecting means 26 by the fluidic circuit inside pedestal 30. More specifically, releasable connecting means 36 of pedestal 30 define both a fluidtight fluidic connection to inlet 9, and a rigid connection to dispenser 12 of container 31.

Dispenser 12 preferably clicks onto releasable connecting means 36 and inlet 9.

In actual use, the FIGS. 2 and 3 device is connected to outlet port 6 and valve V of tyre P in the same way as the FIG. 1 device.

During inflation, pressure regulating valve 29 regulates the pressure of the air from outlet port 6.

More specifically, pressure regulating valve 29 is hand-operated, and comprises a knob 39 by which the user can reduce the flow section of the compressed air to releasable connecting means 36. Consequently, the compressed-air pressure increases alongside an increase in the flow section of pressure regulating valve 29.

Preferably, pressure regulating valve 29 reduces the air flow section to the point of completely cutting off the fluidic circuit of pedestal 30. In a preferred embodiment, pressure regulating valve 29 is maintained automatically, e.g. by elastic means, in the fully-closed, e.g. cut-off, position.

When the user connects hose 26 of the releasable fluidic connecting means to outlet port 6, the pressure at container 31 is either minimum or zero, depending on whether the flow section of the pressure regulating valve is open and set to minimum, or is completely closed.

The user then proceeds to gradually open pressure regulating valve 29 using knob 39, and monitoring the pressure to container 31 on gauge 38.

The compressed air thus empties container 31 to inject all the sealing fluid L into tyre P.

At this point, the compressed air from outlet port 6 inflates tyre P to the optimum pressure, which can be monitored by the user on gauge 38.

The pressure of compressed-air line 3 is normally higher than the maximum pressure required for correct operation of tyre P. For example, the pressure of compressed-air line 3 may be 12 bars, and the optimum operating pressure of the tyre lower.

As a result, despite user adjustment of pressure regulating valve 29, gauge 38 may indicate a higher-than-optimum pressure of tyre P.

In which case, the user may connect tyre P to the atmosphere using release valve 37 and without disconnecting hose 27, and monitor the fall in pressure of tyre P on gauge 38.

If the pressure falls too far below the recommended minimum operating pressure of tyre P, the user may open pressure regulating valve 29 to supply additional compressed air.

The advantages of the unit for repairing and inflating inflatable articles according to the present invention are as follows.

As opposed to a dedicated compressor, a flat tyre can be repaired using the pressure source 2 already provided on the vehicle for supplying another pneumatic device, e.g. the pneumatic actuators of the brake system.

When the pressure of the vehicle compressed-air line is much higher than the optimum operating pressure of the tyre, pressure regulating valve 29 safeguards against overstressing both the sealing-fluid-containing device—in particular, container 31—and the tyre at the repair and inflation stage. Excessive pressure, in fact, may result in irreparable damage to the tyre.

Pedestal 14 with arms 21 makes container 8 extremely stable, and at the same time provides for compact on-vehicle storage of the unused container 8.

The fact that pressure regulating valve 29 returns automatically into the fully-closed position to minimize or cut off compressed-air supply means the user must be present during inflation, and can therefore take immediate action in the event the tyre pressure exceeds the maker's recommended pressure.

On the other hand, if the unit is necessarily left unattended, compressed-air supply to tyre P is automatically minimized or cut off, thus preventing damage to the tyre.

The convex top provides for more effectively withstanding the high pressures required to inflate heavy-duty vehicle tyres.

Clearly, changes may be made to the unit for repairing and inflating inflatable articles as described and illustrated herein without, however, departing from the scope of the present invention as defined in the accompanying claims.

For example, pedestal 14 may define a conduit connected in fluidtight manner to inlet 9 and volume 13 on one side, and to hose 26 on the other. In which case, container 8 is connected both mechanically and fluidically to pedestal 14, and releasable fluidic connecting means 26 comprise pedestal 14.

Alternatively, the dispenser and pedestal may define one body; in which case, the inlet and outlet are defined on the one body.

In a further embodiment, bottle 11 may also be connected in fixed manner to dispenser 12, and may also define one body with tubular portion 15; in which case, the releasable fluidic connecting means only comprise the hose with the relative fast-fit couplings.

Arms 21 may be connected differently to move between a withdrawn and extracted position. For example, arms 21 may be straight, and slide inside runners defined by pedestal 14.

The vehicle may be a heavy-duty vehicle or a passenger car comprising a compressed-air circuit, e.g. for controlling an active shock absorbing system.

The pressure regulating valve may be connected in other positions, e.g. between inlet 9 and releasable connecting means 26, or may be integrated in releasable connecting means 26 and/or the sealing-fluid-containing device.

Instead of a pressure regulating valve 29 that returns automatically into the fully-closed position, the unit may comprise a pressure regulating valve that maintains the user-set position using knob 39; and, in combination with it, a control valve 40 (FIG. 3) located upstream from volume 13 and in series with pressure regulating valve 29. Control valve 40 is preferably a discrete-setting valve, and is designed to be normally closed or have a minimum compressed-air flow section, and to return to the closed or minimum-flow-section position when released, e.g. by means of elastic means closing a shutter. When control valve 40 is in the closed or minimum-flow-section position, compressed-air flow is zero or minimum, and at any rate such as to avoid damaging tyre P or the repair and inflation unit, in the event the unit is left unattended with pressure regulating valve 29 open.

In this embodiment, the user must keep control valve pressed to supply compressed air to the tyre, and regulates pressure using pressure regulating valve 29.

Control valve 40 is preferably integrated in the sealing-fluid-containing device, and even more preferably in pedestal 14.

The sealing-fluid-containing device may have no pressure regulating valve 29, if the pressure of the compressed-air line is such as to inflate the tyre without damaging the device. In which case, the device may comprise one or any combination of release valve 37 and/or gauge 38 and/or control valve 40, so the user can regulate and/or monitor tyre pressure once the sealing fluid is injected, and/or safely feed compressed air into tyre P by keeping control valve 40 pressed.

The invention claimed is:

1. A unit for repairing an inflatable article, the unit defining a volume (13) for a sealing fluid (L); an inlet (9) for compressed air, and an outlet (10) connected fluidically to said inlet (9) via said volume (13) to inject the sealing fluid into said inflatable article by means of the compressed air; releasable fluidic connecting means (26) for connecting said inlet (9) to an outlet port (6) of a pneumatic circuit of a vehicle comprising a compressed-air source (2) connected fluidically to said outlet port (6), and at least one pneumatic actuator (4) connected to the compressed-air source (2); said unit being characterized in that a pressure regulating valve (29) located upstream from said volume (13) to regulate the pressure of the air to said volume (13), wherein said pressure regulating valve (29) is integrated with said releasable fluidic connecting means (26).

2. A unit as claimed in claim 1, characterized by comprising a container (8) defining said volume (13) and said inlet (9); and in that said releasable fluidic connecting means (26) comprise a pedestal (14) connectable releasably to said container (8).

3. A unit as claimed in claim 2, characterized in that said pedestal (14) defines a fluidic connection to said volume (13).

4. A unit as claimed in claim 2, characterized in that said pressure regulating valve (29) is integrated in said pedestal (14).

5. A unit as claimed in claim 2, characterized in that said pedestal (14) comprises at least one arm (21) movable between an extracted position and a withdrawn position.

6. A unit as claimed in claim 5, characterized in that said at least one arm (21) rotates about an axis.

7. A unit as claimed in claim 5, characterized in that said at least one arm (21) is a sliding arm.

8. A unit as claimed in claim 5, characterized in that, in said withdrawn position, a crosswise dimension of said pedestal (14) is smaller than or equal to that of said container (8).

9. A unit as claimed in claim 5, characterized in that said pedestal (14) defines at least one radially through, axially open groove (23) for housing said outlet (10).

10. A unit as claimed in claim 2, characterized by comprising a first hose (27) for connecting said outlet (10) to said inflatable article; and in that said pedestal (14) defines a recess (17) in which to at least partly wind said first hose (27).

11. A unit as claimed in claim 2, characterized in that said releasable fluidic connecting means comprise a second hose (26).

12. A unit as claimed in claim 2, characterized in that said container (8) comprises a convex top.

13. A unit as claimed in claim 1, characterized in that said pressure regulating valve (29) is designed to continuously regulate the pressure of the air to said volume (13).

14. A unit as claimed in claim 1, characterized in that said pressure regulating valve (29) is hand-operated.

15. A unit as claimed in claim 1, characterized by comprising hand-operated control means (40) for controlling said compressed air to said inflatable article, and which are movable between a fully-closed position, in which the pressure downstream equals a minimum value, and a regulating position, in which the control means are open, and the pressure downstream increases with respect to said minimum value; said control means (40) being designed to return automatically to said fully-closed position when released by the user.

16. A unit as claimed in claim 15, characterized in that said control means (40) are series-connected to said pressure regulating valve (29).

17. A unit as claimed in claim 15, characterized in that said control means are integrated in said pressure regulating valve (29).

18. A unit as claimed in claim 1, characterized by comprising a release valve (37) downstream from said pressure regulating valve (29).

19. A unit as claimed in claim 1, characterized by comprising a gauge (38) connected downstream from said pressure regulating valve (29).

* * * * *